(12) United States Patent
Sharma et al.

(10) Patent No.: US 8,582,462 B2
(45) Date of Patent: Nov. 12, 2013

(54) NETWORK COMMUNICATIONS OVER SHARED LINKS IN A VIRTUALIZED ENVIRONMENT

(75) Inventors: Rakesh Sharma, Austin, TX (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 13/006,919

(22) Filed: Jan. 14, 2011

(65) Prior Publication Data

US 2012/0185846 A1 Jul. 19, 2012

(51) Int. Cl.
*H04L 12/26* (2006.01)

(52) U.S. Cl.
USPC ............ 370/252; 370/397; 709/236; 709/250

(58) Field of Classification Search
None
See application file for complete search history.

(56) References Cited

U.S. PATENT DOCUMENTS

| | | | | |
|---|---|---|---|---|
| 7,711,789 | B1 * | 5/2010 | Jnagal et al. | 709/213 |
| 8,027,354 | B1 * | 9/2011 | Portolani et al. | 370/431 |
| 8,265,075 | B2 * | 9/2012 | Pandey | 370/389 |
| 8,315,156 | B2 * | 11/2012 | Droux et al. | 370/216 |
| 2011/0029675 | A1 * | 2/2011 | Yeow et al. | 709/226 |
| 2012/0002535 | A1 * | 1/2012 | Droux et al. | 370/216 |
| 2012/0042095 | A1 * | 2/2012 | Kotha et al. | 709/233 |
| 2012/0063363 | A1 * | 3/2012 | Li et al. | 370/255 |
| 2012/0209940 | A1 * | 8/2012 | Kidambi et al. | 709/212 |
| 2012/0210319 | A1 * | 8/2012 | Recio et al. | 718/1 |

OTHER PUBLICATIONS

IEEE Computer Society—IEEE Standard for Local and Metropolitan Area Networks: "Station and Media Access Control Connectivity Discovery"—IEEE Std 802.1AB-2009—Sep. 17, 2009.
IEEE Standards Department—Draft Standard for Local and Metropolitan Area Networks: "Virtual Bridged Local Area Networks—Amendment XX: Enhanced Transmission Selection for Bandwidth Sharing Between Traffic Classes"—IEEE P802.1Qaz/D2.3—Dec. 17, 2010.
IEEE Standards Activities Dept.—Draft Standard for Local and Metropolitan Area Networks: "Virtual Bridged Local Area Networks—Amendment XX: Edge Virtual Bridging"—IEEE P802.1Qbg/D1.3—Dec. 20, 2010.

* cited by examiner

*Primary Examiner* — Michael J Moore, Jr.
(74) *Attorney, Agent, or Firm* — Yudell Isidore Ng Russell PLLC (57) ABSTRACT

A physical host executes a virtual machine monitor (VMM) that instantiates a plurality of virtual machines (VMs). The VMM supports processing of a virtual link manager (VLM) that deploys and configures a plurality of Layer 2 virtual links sharing bandwidth of a Layer 2 physical link between the physical host and an access switch. The VMM communicates parameters of the plurality of virtual links with the access switch.

14 Claims, 10 Drawing Sheets

NETWORK COMMUNICATIONS OVER SHARED LINKS IN A VIRTUALIZED ENVIRONMENT

BACKGROUND OF THE INVENTION

1. Technical Field

The present invention relates in general to data processing, and in particular, to data processing environments including virtual networks.

2. Description of the Related Art

In general, "utility computing" refers to a computational model in which processing, storage and network resources, software, and data are accessible to client computer systems and other client devices (e.g., mobile phones or media players) on demand, much like familiar residential utility services, such as water and electricity. In some implementations, the specific computational resources (e.g., servers, storage drives, etc.) allocated for access and use by client devices are specified by service agreements between the utility computing provider and its customers. In other implementations, commonly referred to as "cloud computing," details of the underlying information technology (IT) infrastructure are transparent to the utility computing customers.

Cloud computing is facilitated by ease-of-access to remote computing websites (e.g., via the Internet or a private corporate network) and frequently takes the form of web-based resources, tools or applications that a cloud consumer can access and use through a web browser, as if the resources, tools or applications were a local program installed on a computer system of the cloud consumer. Commercial cloud implementations are generally expected to meet quality of service (QoS) requirements of cloud consumers, which may be specified in service level agreements (SLAs). In a typical cloud implementation, cloud consumers consume computational resources as a service and pay only for the resources used.

Adoption of utility computing has been facilitated by the widespread utilization of virtualization, which is the creation of virtual (rather than actual) versions of computing resource, e.g., an operating system, a server, a storage device, network resources, etc. For example, a virtual machine (VM), also referred to as a logical partition (LPAR), is a software implementation of a physical machine (e.g., a computer system) that executes instructions like a physical machine. VMs can be categorized as system VMs or process VMs. A system VM provides a complete system platform that supports the execution of a complete operating system (OS), such as Windows, Linux, AIX, Android, etc., as well as its associated applications. A process VM, on the other hand, is usually designed to run a single program and support a single process. In either case, any application software running on the VM is limited to the resources and abstractions provided by that VM. Consequently, the actual resources provided by a common IT infrastructure can be efficiently managed and utilized through the deployment of multiple VMs, possibly from multiple different utility computing customers.

The virtualization of actual IT resources and management of VMs is typically provided by software referred to as a VM monitor (VMM) or hypervisor. In various implementations, a VMM may run on bare hardware (Type 1 or native VMM) or on top of an operating system (Type 2 or hosted VMM).

In a typical virtualized computing environment, VMs can communicate with each other and with physical entities in the IT infrastructure of the utility computing environment utilizing conventional networking protocols. As is known in the art, conventional networking protocols are commonly premised on the well known seven layer Open Systems Interconnection (OSI) model, which includes (in ascending order) physical, data link, network, transport, session, presentation and application layers. VMs are enabled to communicate with other network entities as if the VMs were physical network elements through the substitution of a virtual network connection for the conventional physical layer connection.

Disclosed herein are techniques for enhancing network communication in such virtual computing environments.

SUMMARY OF THE INVENTION

A a physical host executes a virtual machine monitor (VMM) that instantiates a plurality of virtual machines (VMs). The VMM supports processing of a virtual link manager (VLM) that deploys and configures a plurality of Layer 2 virtual links sharing bandwidth of a Layer 2 physical link between the physical host and an access switch. The VMM communicates parameters of the plurality of virtual links with the access switch.

DETAILED DESCRIPTION OF ILLUSTRATIVE EMBODIMENT

Figure 1:
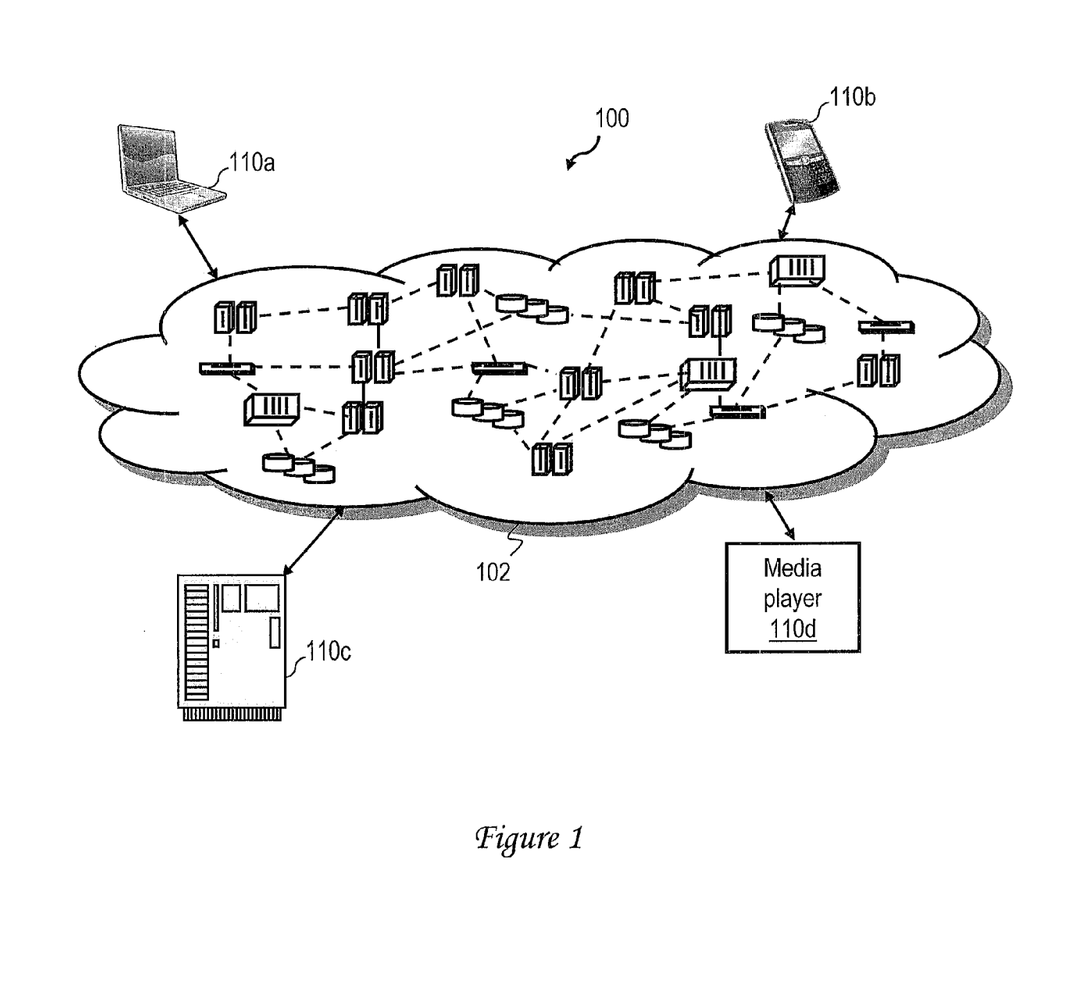
FIG. 1 is a high level block diagram of a data processing environment in accordance with one embodiment.

With reference now to the figures and with particular reference to FIG. 1, there is illustrated a high level block diagram of an exemplary data processing environment 100 in accordance within one embodiment. As shown, data processing environment 100, which in the depicted embodiment is a cloud computing environment, includes a collection of computing resources commonly referred to as a cloud 102. Computing resources within cloud 102 are interconnected for communication and may be grouped (not shown) physically or virtually, in one or more networks, such as private, community, public, or hybrid clouds or a combination thereof. In this manner, data processing environment 100 can offer infrastructure, platforms and/or software as services accessible to client devices 110, such as personal (e.g., desktop, laptop, netbook, tablet or handheld) computers 110*a*, smart phones 110*b*, server computer systems 110*c* and consumer electronics, such as media players (e.g., set top boxes, digital versatile disk (DVD) players, or digital video recorders (DVRs)) 110*d*. It should be understood that the types of client devices 110 shown in FIG. 1 are illustrative only and that client devices 110 can be any type of electronic device capable of communicating with and accessing services of computing resources in collection 110 via a packet network.

Figure 2:
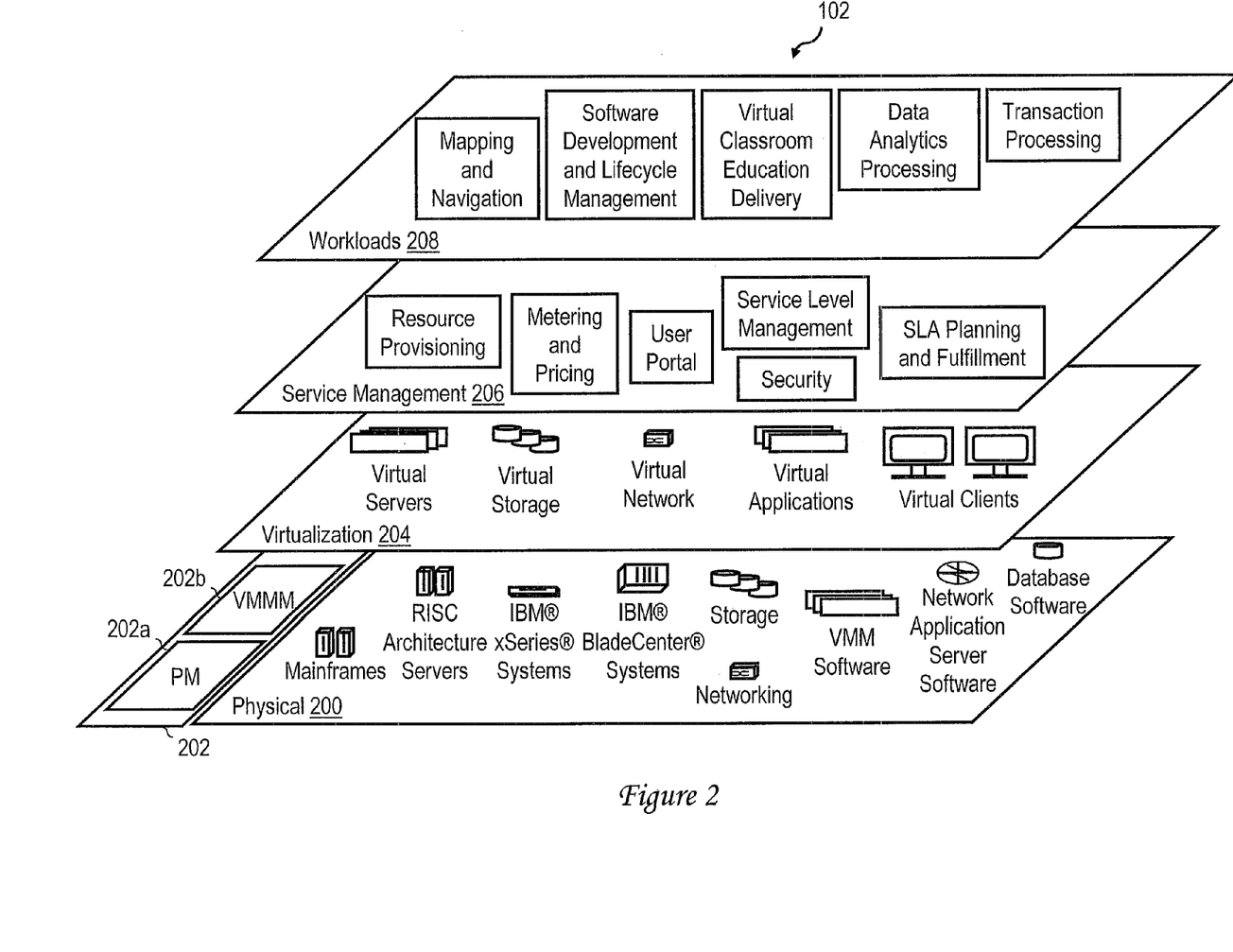
FIG. 2 depicts the layering of virtual and physical resources in the exemplary data processing environment of FIG. 1 in accordance with one embodiment.

FIG. 2 is a layer diagram depicting the virtual and physical resources residing in collection of cloud 102 of FIG. 1 in accordance with one embodiment. It should be understood that the computing resources, layers, and functions shown in FIG. 2 are intended to be illustrative only and embodiments of the claimed inventions are not limited thereto.

As depicted, cloud 102 includes a physical layer 200, a virtualization layer 204, a service management layer 206, and a workloads layer 208. Physical layer 200 includes various physical hardware and software components that can be used to instantiate virtual entities for use by the cloud service provider and its customers. As an example, the hardware components may include mainframes (e.g., IBM® zSeries® systems), reduced instruction set computer (RISC) architecture servers (e.g., IBM pSeries® systems), IBM xSeries® systems, IBM BladeCenter® systems, storage devices (e.g., flash drives, magnetic drives, optical drives, tape drives, etc.), physical networks, and networking components (e.g., routers, switches, etc.). The software components may include virtual machine monitor (VMM) or hypervisor software, operating system software (e.g., AIX, Windows, Linux, VMware, Android, etc.), network application server software (e.g., IBM WebSphere® application server software, which includes web server software), and database software (e.g., IBM DB2® database software). IBM, zSeries, pSeries, xSeries, BladeCenter, WebSphere, and DB2 are trademarks of International Business Machines Corporation registered in many jurisdictions worldwide.

The resource of physical layer 200 can be administered across cloud 102 in a unified manner through management software 202. In the depicted embodiment, management software 202 includes platform management (PM) software 202*a* that manages the physical computing platforms, networks and storage resources of physical layer 200, as well as VMM management (VMMM) software 202*b* that manages VMMs deployed on the physical computing platforms. Management software 202 may run, for example, on a physical computing platform within physical layer 200 that is designated as a management console.

The computing resources residing in physical layer 200 of cloud 102 are virtualized and managed by one or more VMMs. The VMMs present a virtualization layer 204 including virtual entities (e.g., virtual servers, virtual storage, virtual networks (including virtual private networks)), virtual applications, and virtual clients. As discussed previously, these virtual entities, which are abstractions of the underlying resources in physical layer 200, may be accessed by client devices 110 of cloud consumers on-demand.

The VMM(s) also support a service management layer 206 that implements various management functions for cloud 102. These management functions can be directly implemented by the VMM(s) and/or by one or more management or service VMs running on the VMM(s) and may provide functions such as resource provisioning, metering and pricing, security, user portal services, service level management, and SLA planning and fulfillment. The resource provisioning function provides dynamic procurement of computing resources and other resources that are utilized to perform tasks within the cloud computing environment. The metering and pricing function provides cost tracking (as resources are provisioned and utilized within the cloud computing environment) and billing or invoicing for consumption of the utilized resources. As one example, the utilized resources may include application software licenses. The security function provides identity verification for cloud consumers and tasks, as well as protection for data and other resources. The user portal function provides access to the cloud computing environment for consumers and system administrators. The service level management function provides cloud computing resource allocation and management such that required service levels are met. For example, the security function or service level management function may be configured to limit deployment/migration of a virtual machine (VM) image to geographical location indicated to be acceptable to a cloud consumer. The service level agreement (SLA) planning and fulfillment function provides pre-arrangement for, and procurement of, cloud computing resources for which a future requirement is anticipated in accordance with an SLA.

Workloads layer 208, which may be implemented by one or more consumer VMs, provides examples of functionality for which the cloud computing environment may be utilized. Examples of workloads and functions which may be provided from workloads layer 208 include: mapping and navigation; software development and lifecycle management; virtual classroom education delivery; data analytics processing; and transaction processing. Of course, the workloads present in workloads layer 208 will vary between embodiments depending upon the needs and desires of cloud consumers.

Figure 3:
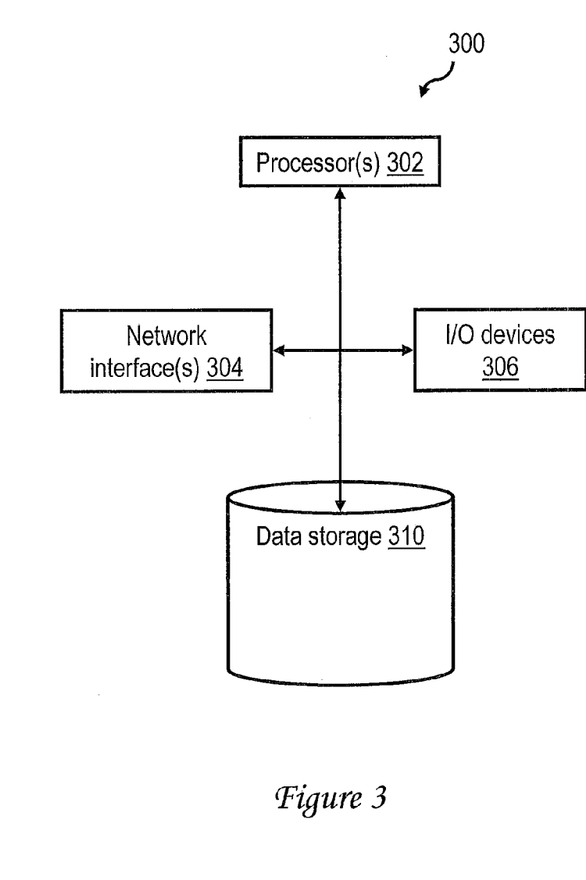
FIG. 3 is a high level block diagram of a data processing system in accordance with one embodiment.

With reference now to FIG. 3, there is illustrated a high level block diagram of an exemplary data processing system 300 that can be utilized to implement a physical host computing platform in physical layer 200 of FIG. 2 or a client device 110 of FIG. 1. In the illustrated exemplary embodiment, data processing system 300 includes one or more network interfaces 304 that permit data processing system 300 to communicate with one or more computing resources in cloud 102 via cabling and/or one or more wired or wireless, public or private, local or wide area networks (including the Internet). Data processing system 300 additionally includes one or more processors 302 that process data and program code, for example, to manage, access and manipulate data or software in data processing environment 100. Data processing system 300 also includes input/output (I/O) devices 306, such as ports, displays, and attached devices, etc., which receive inputs and provide outputs of the processing performed by data processing system 300 and/or other resource(s) in data processing environment 100. Finally, data processing system 300 includes data storage 310, which may include one or more volatile or non-volatile storage devices, including memories, solid state drives, optical or magnetic disk drives, tape drives, etc. Data storage 310 may store, for example, software within physical layer 200 and/or software, such as a web browser, that facilitates access to workloads layer 208 and/or service management layer 206.

Figure 4:
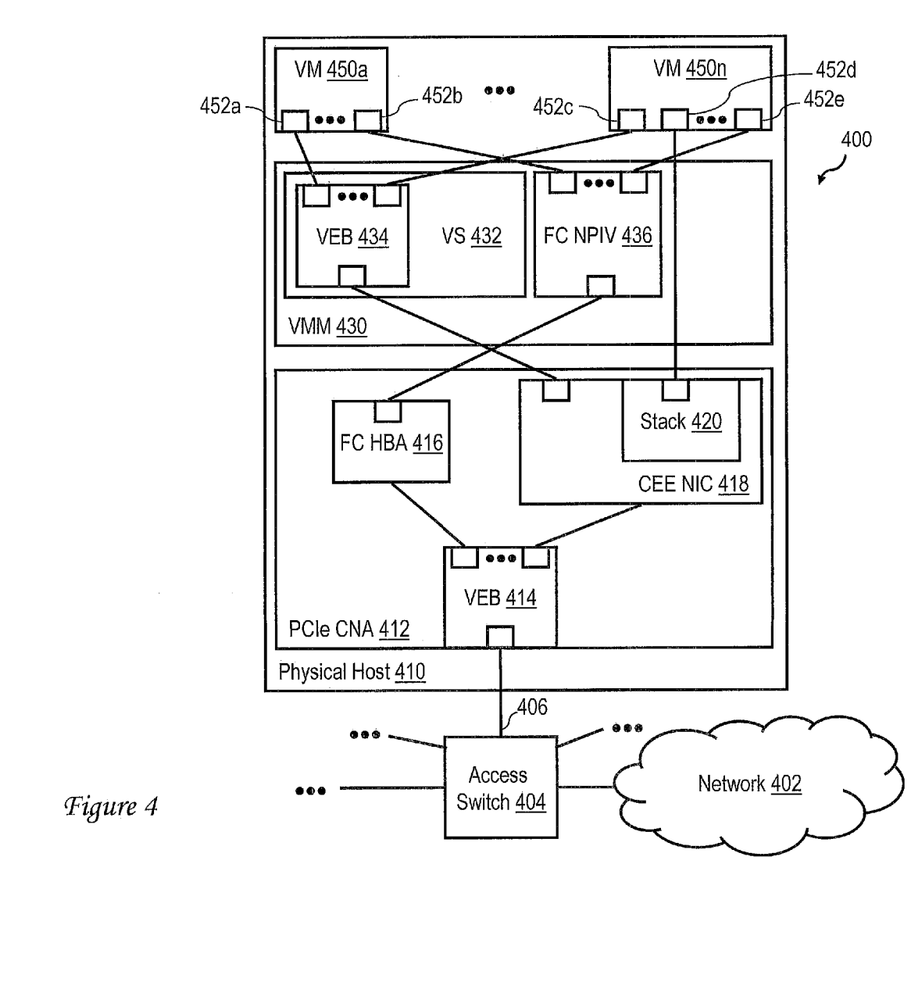
FIG. 4 is a first high level block diagram of a portion of a data processing environment employing virtual networking in accordance with one embodiment.

Referring now to FIG. 4, there is depicted a high level block diagram of a portion of a data processing environment 400 employing virtualization in accordance with one embodiment. For example, data processing environment 400 can implement a portion of cloud 102 depicted in FIG. 1.

In the depicted embodiment, data processing environment 400 includes a network 402, which may include one or more wired or wireless local area networks (LANs) or wide area networks (WANs), such as the Internet. Connected to network 402 is a high performance access switch 404 providing OSI Layer 2 connectivity to network 402 for one or more physical hosts including physical host 410, which is connected to access switch 404 by a high bandwidth physical link 406. For example, physical link 406 may have a bandwidth of 40 Gb/s, 100 Gb/s or more.

Physical host 410 of FIG. 4 can be implemented, for example, utilizing a data processing system 300 as depicted in FIG. 3. For example, in the depicted example, network interface(s) 304 of physical host 410 include a Peripheral Component Interconnect Express (PCIe) Converged Network Adapter (CNA) 412. In the depicted embodiment, PCIe CNA 412 includes a Virtual Ethernet Bridge (VEB) 414 coupled to physical link 406, as well as support for a plurality of diverse OSI Layer 2 networks. Thus, in this example, PCIe CNA 412 includes at least a Fibre Channel Host Bus Adapter (FC HBA) 416 and a Converged Enhanced Ethernet (CEE) Network Interface Card (NIC) 418.

Physical host 410 executes a VMM 430, which virtualizes and manages the resources of physical host 410, for example, under the direction of VMMM 202b executing on a management console within cloud 102. VMM 412 supports the execution of one or more (and potentially thousands of) VMs, which in the depicted example include VMs 450a-450n. In various embodiments, VMs 450a-450n can include VMs of one or more cloud consumers and/or a cloud provider. In the depicted embodiment, each of VMs 450 has at least one (and in some cases multiple) of virtual network interfaces 452a-452e, which provide network connectivity at least at Layer 2 of the OSI model.

As depicted, VMM 430 provides one or more (and in the depicted embodiment, at least two) virtual networks to which its VMs 450 can attach. For example, in the depicted embodiment, VMM 412 provides a first virtual Layer 2 network through the implementation of a virtual switch (VS) 432 including a VEB 434. VMM 412a similarly provides a second virtual network through the implementation of FC N_Port Identifier Virtualization (FC NPIV) 436. In various embodiments, each of the virtual networks supported by VMM 430 can be, for example, a private network of a particular cloud consumer, a collaborative private network shared by multiple cloud consumers and/or a cloud provider, or a public network.

In the depicted example, network interface 452a of VM 450a is connected via VEB 434 to the first virtual network, and network interface 452b of VM 450a is connected to the second virtual network via FC NPIV 436. Similarly, network interface 452c of VM 450n is connected via VEB 434 to the first virtual network, and network interface 452e of VM 450n is connected to the second virtual network via FC NPIV 436. VM 450n includes an additional network interface 452d that bypasses the virtual networks supported by VMM 430 (and the concomitant overhead) and is connected via VMM 430 directly to a stack 420 provided as a "virtual function" of CEE NIC 418. As further shown in FIG. 4, FC NPIV 436 is connected to FC HBA 416 of PCIe CNA 412, and VEB 434 of VS 432 is connected to CEE NIC 418. The traffic of FC HBA 416 and CEE NIC 418 converge at VEB 414 of PCIe CNA 412.

As discussed further below, VMM 430 improves the management and utilization of the high bandwidth of physical link 406 by collaboratively managing the physical link 406 as a collection of virtual links (VLs), also referred to in the art as "S-channels". The implementation of S-channels for edge virtual bridging is described for example, in IEEE standard IEEE 802.1ad (also known as IEEE 802.1QinQ) dated May 26, 2006, and in draft standard IEEE P802.1Qbg dated Dec. 20, 2010, which are incorporated herein by reference.

Figure 5:
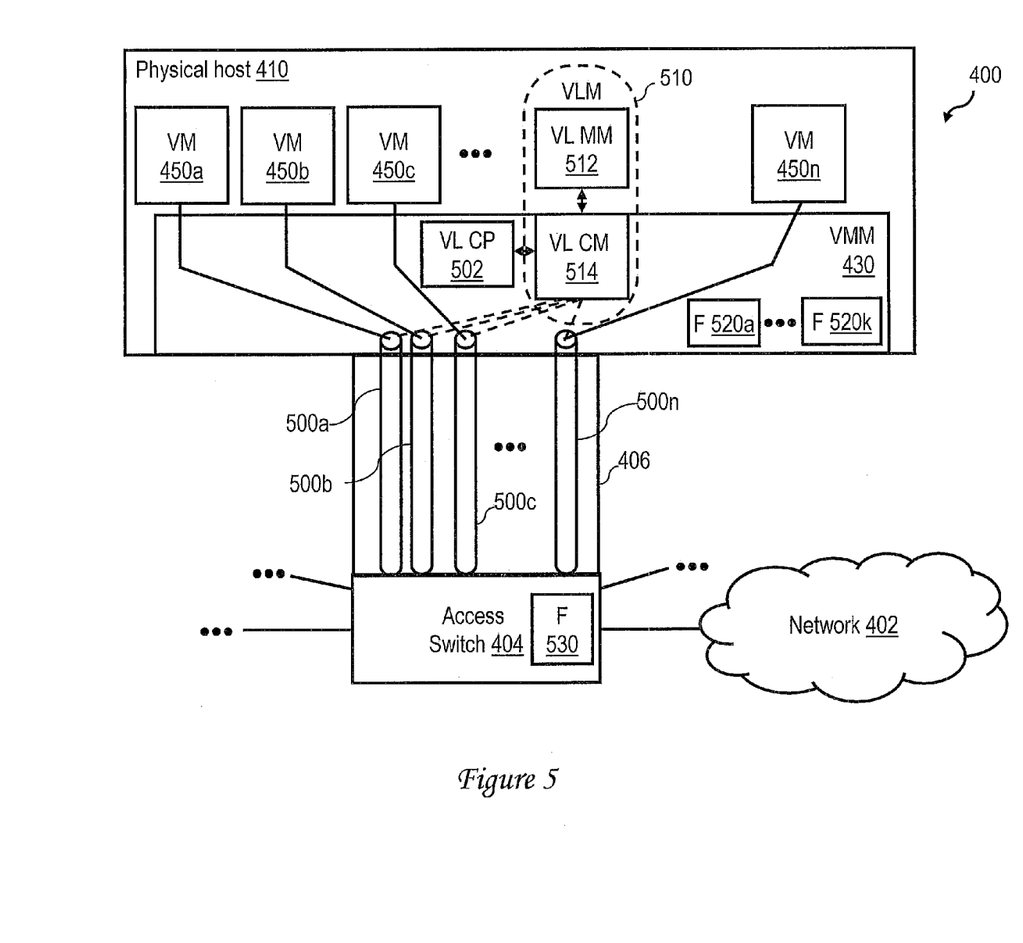
FIG. 5 is a second high level logical view of the portion of the exemplary data processing environment 400 depicted in FIG. 4.

With reference now to FIG. 5, there is illustrated a second high level logical view of the portion of the exemplary data processing environment 400 depicted in FIG. 4. In particular, FIG. 5 depicts that VMM 430 of physical host 410 virtualizes physical link 406 to access switch 404 by creating and managing a plurality of virtual links 500a-500n, which are formed by tagging the frames of each virtual link 500 with a respective one of a plurality of different provider bridging service tags (S-Tags). As depicted in FIG. 5, VMM 430 may assign each of virtual links 500a-500n to a respective one (or multiple) of VMs 450a-450n, Alternatively, VMM 430 may allocate one or more of virtual links 500 on a per-cloud customer basis. Further, in embodiments in which physical host 410 executes multiple simultaneous VMMs 430, one or more of virtual links 500 may be assigned on a per-VMM basis.

As further indicated in FIG. 5, virtual links 500a-500n span at least from VMM 430 to access switch 404, meaning that PCIe CNA 412 need not provide explicit support for virtual links 500. In some embodiments, VMs 450a-450n need not (and in one preferred embodiment do not) have the capability of tagging or untagging frames of network traffic. (In alternative embodiments, virtual links 500a-500n further extend across VMM 430 to one or more of VMs 450a-450n by enabling at least some of VMs 450a-450n to apply S-Tags to their respective frames.) In the depicted embodiment in which virtual links 500a-500n span between VMM 430 and access switch 404, VMM 430 applies S-Tags to frames originated by VMs 450a-450n by reference to one or more data structures, such as forwarding tables 520a-520k of one or more virtual Layer 2 networks implemented by VMM 430, which associate particular source Layer 2 (e.g., MAC) addresses with corresponding S-Tags. Access switch 404 may similarly apply S-Tags to frames to be communicated over physical link 406 by reference to forwarding table 530, which associates particular destination Layer 2 addresses with corresponding S-Tags.

Configuration and management of virtual links 500a-500n is implemented by a virtual link manager (VLM) 510 supported by VMM 430. In the illustrated embodiment, VLM 510 includes two components, a virtual link management module (VL MM) 512 providing an external management interface (e.g., an application programming interface (API) and/or command line interface (CLI)) and a virtual link control module (VL CM) 514 that implements and monitors virtual links 500a-500d in accordance with VL management commands received from VL MM 512. It should be appreciated that VLM 510 need not include a distinct management module (i.e., VL MM 512), and can alternatively be implemented monolithically either within VMM 430 or as a management process running on top of VMM 430.

In one preferred embodiment, the management functions supported by VLM 510 (and implemented, for example, via input(s) to the interface(s) of VL CM 514) include those summarized in Table I below.

TABLE I

| Management Function Group | Subsidiary management functions |
|---|---|
| Physical link management | Link-up |
|  | Link-down |
|  | Link-reset |
|  | Link event log |
|  | Link statistics |
| VL control enable/disable |  |
| VL-to-VM association |  |
| VL management | VL Create |
|  | VL Destroy |

TABLE I-continued

| Management Function Group | Subsidiary management functions |
|---|---|
| | VL Bandwidth & QoS configuration |
| | Virtual Link-up |
| | Virtual Link-down |
| | Virtual Link-reset |
| | Virtual Link event log |
| | Virtual Link statistics |
| VL Security | Authentication |
| | Authorization |
| | Privacy |
| | Non-repudiation |

In response to receipt of an input signifying a management function, VLM 510 preferably collaborates with access switch 404 to implement the desired allocation of, and manage frame transmission on, physical link 406 on a per-virtual link basis. For example, in one preferred embodiment, VLM 510 discovers the VL capabilities of access switch 404, exchanges configuration parameters with access switch 404 and configures VL parameters utilizing the VL Control Protocol (VLCP). In this preferred embodiment, VLCP, which runs over virtual links 500*a*-500*n* (i.e., protocol frames are tagged with S-Tags) using the Edge Control Protocol (ECP) defined by IEEE 802.1Qbg as the transport protocol, and employs the Type, Length, Value (TLV) specification defined in IEEE 802.1ab (incorporated by reference herein) to enable configuration parameter exchange and configuration between VLM 510 and access switch 404.

Figure 6:
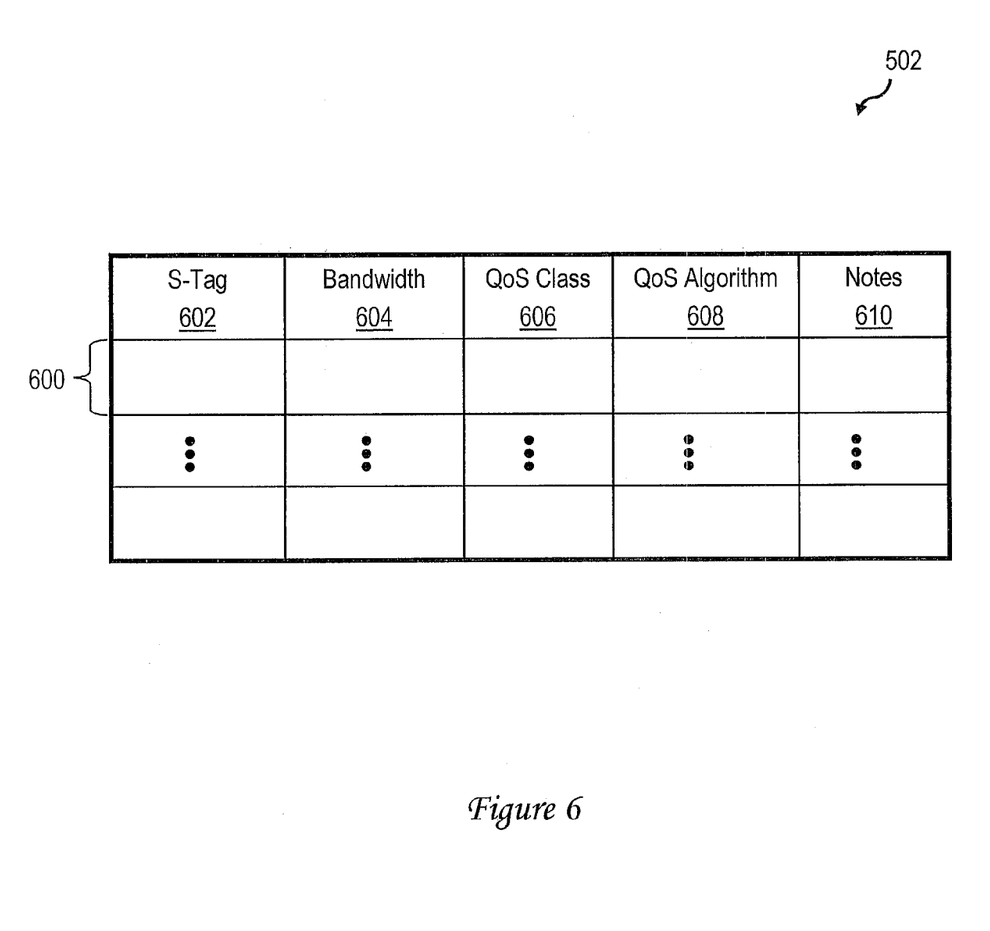
FIG. 6 depicts an exemplary tabular embodiment of the virtual link configuration parameters (VL CP) for a physical link.

Assuming that the VLM 510 and access switch 404 agree on parameters for the virtual links 500, VLM 510 records the parameters as VL configuration parameters (VL CP) 502, which can conveniently be organized in some type of data structure, such as a table. Referring now to FIG. 6, there is depicted one exemplary embodiment of VL CP 502 implemented as a table. In the exemplary embodiment, VL CP 502 includes a plurality of entries 600 each corresponding to a respective one of virtual links 500*a*-500*n* spanning physical link 406. Each entry 600 includes a S-Tag field 602 specifying the S-Tag utilized to define the associated virtual link 500 and identify the frames thereof, as well as a bandwidth field 604 specifying the share of the bandwidth of physical link 406 allocated to the associated virtual link 500, expressed, for example, as a percentage of the total link bandwidth or as an absolute value. Bandwidth field 604 may further indicate whether the provisioned bandwidth is fixed or can be varied up and/or down based on dynamic bandwidth utilization by other virtual links 500. Each entry 600 additionally includes a Quality of Service (QoS) class field 606, which may indicate, for example, packet delay characteristics, packet drop characteristics (e.g., lossy versus lossless), and a VL priority for prioritizing service in a resource constrained system. Entry 600 may optionally further include a QoS algorithm field 608 specifying a QoS algorithm utilized to compute the QoS for the associated virtual link 500 and a notes field 610 for documenting one or more additional parameters of the associated virtual link 500.

Figure 7:
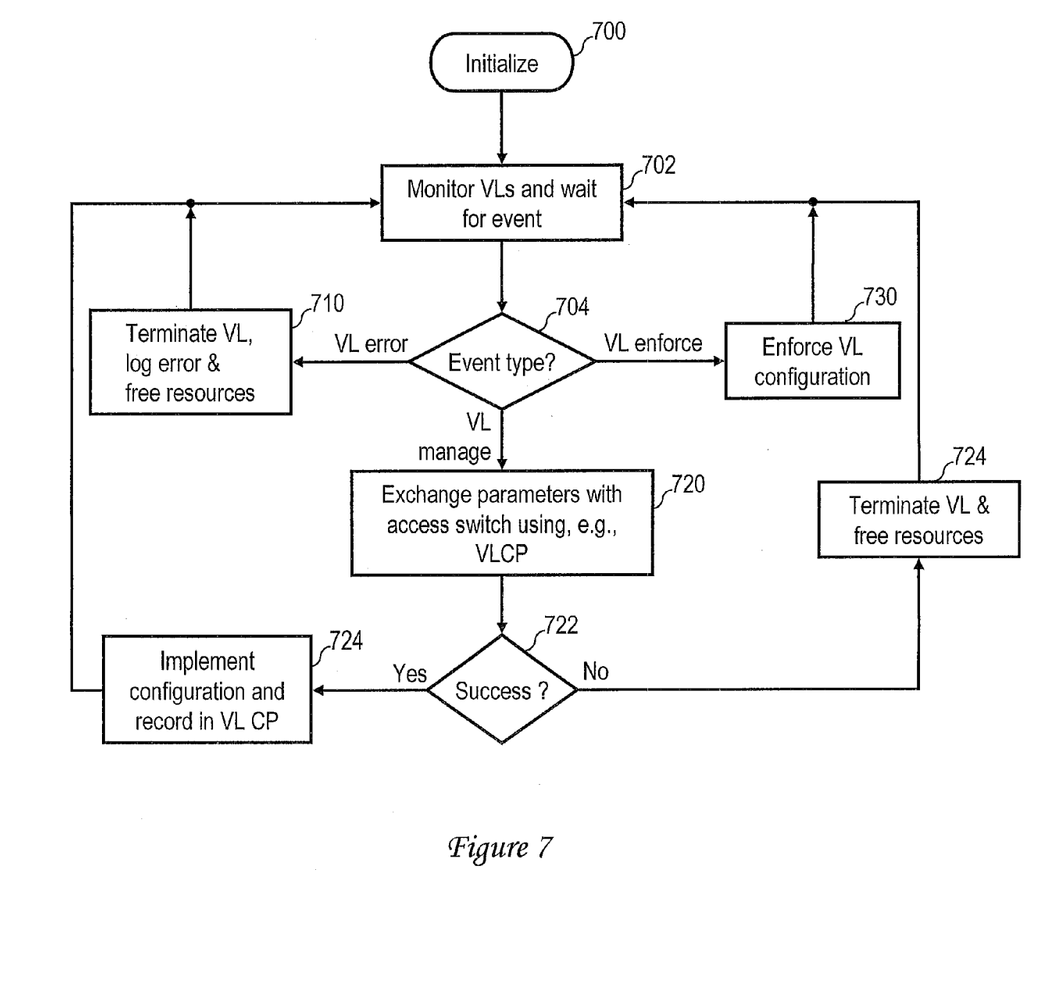
FIG. 7 is a high level logical flowchart of the operation of a virtual link manager (VLM) in accordance with one embodiment.

With reference now to FIG. 7, there is depicted a high level logical flowchart of the operation of VLM 510 in accordance with one embodiment. The process begins at block 700, which depicts VMM 430 initializing VLM 510 to configure, manage and control virtual links implemented over physical link 406. Thereafter, the process proceeds to block 702, which depicts VLM 510 monitoring the state, statistics and performance of virtual links 500 while awaiting an occurrence of an event. The monitoring at block 702 includes monitoring for per-link compliance with the parameters recorded in VL CP 502.

In response to detection of an event at block 702, VLM 510 determines the type of the event at block 704. In response to a determination that the detected event is a VL error event indicating occurrence of an error, the process proceeds from block 704 to block 710, which depicts VLM 510 terminating the virtual link 500 for which error the error was detected, logging the error, and freeing resources associated with the terminated virtual link 500. The freed resources include, for example, resources utilized to monitor the terminated virtual link 500 and the associated entry 600 in VL CP 502. The process then returns from block 710 to block 702, which has been described.

Referring again to block 704, in response to a determination that the detected event is a VL manage event representing receipt of a input via VL MM 512, the process proceeds from block 704 to block 720. Block 720 depicts VLM 510 invoking the exchange of proposed virtual link parameters for a particular virtual link 500 between VMM 430 and access switch 404. The proposed virtual link parameters can implement any of the VL management functions summarized in Table I, supra, including provisioning or tearing down a virtual link 500, allocating (or reallocating) bandwidth to a virtual link 500, determining QoS or security parameters for a virtual link 500, etc. As described above, the proposed virtual link parameters can be communicated, for example, utilizing VLCP.

Figure 8:
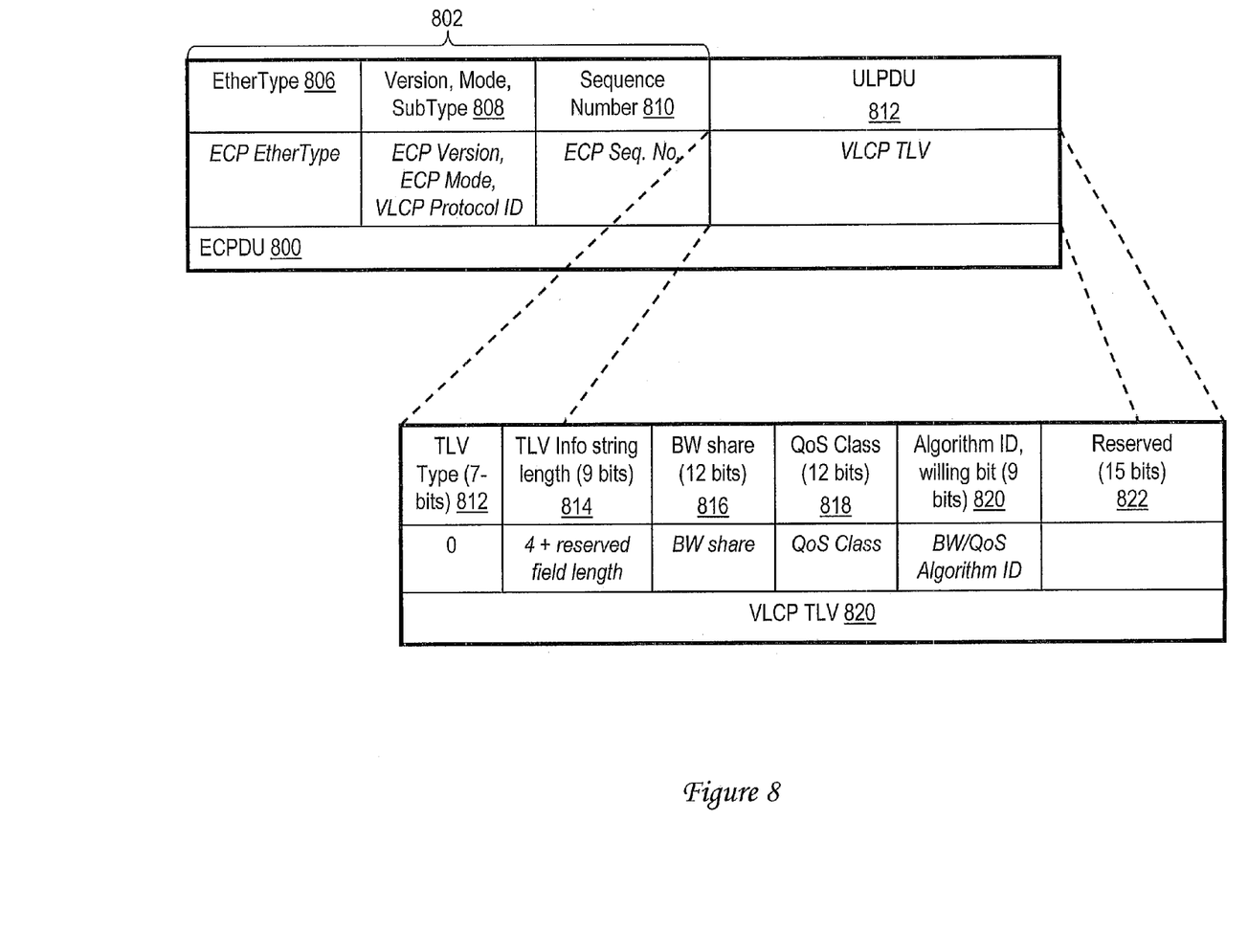
FIG. 8 depicts an Edge Control Protocol Data Unit (ECPDU) that can be utilized to transport virtual link configuration parameters in accordance with one embodiment.

FIG. 8 depicts an Edge Control Protocol Data Unit (ECPDU) 800 defined by IEEE 802.1 Qbg that can be utilized to transport virtual link configuration information in accordance with one embodiment. In the depicted embodiment, ECPDU 800, which is preferably accompanied in a control frame by conventional Layer 2 source and destination addresses and an S-Tag identifying the particular virtual link 500 with which the proposed virtual link parameters are associated, includes a header 802 and a payload comprising a Upper Layer Protocol Data Unit (ULPDU) field 812. Header 802 includes an Ethertype field 802 containing the Ethertype assigned for use by ECP, as well as a Version, Mode, Subtype field 808 identifying the ECP protocol version, the operation type (e.g., ECP request or ECP acknowledgement), and the Upper Layer Protocol (ULP) type of ULPDU 812, which in this case is VLCP. Header 802 additionally includes a Sequence Number field 810 identifying the sequential order of PDU 800 with respect to other ECPDUs.

As noted above, the payload of the exemplary ECPDU 800 is an ULPDU field 812 containing a VLCP TLV 820 as defined by IEEE 802.1ab. In the depicted embodiment, VLCP TLV 820 includes a TLV type field 812 identifying the type of TLV (in this example, Type 0, signifying the end of a PDU), a TLV information string length field 814 specifying a length of the TLV (e.g., in octets), a bandwidth share field 816 specifying a bandwidth share for the relevant virtual link 500 (expressed, for example, as a percentage or absolute value), a QoS class field 818 specifying a QoS class for the virtual link 500, an algorithm ID field 820 specifying an identifier of an algorithm utilizing to allocate and measure bandwidth utilization and QoS for the virtual link 500, and a reserved field 822.

Returning to FIG. 7, following transmission of the proposed virtual link parameters to access switch 404 at block 720, VLM 510 determines at block 722 whether or not the proposed virtual link parameters were agreed to by access switch 404. The determination shown at block 722 can be made, for example, based upon whether access switch 404 acknowledged the virtual link parameters transmitted at block 720, for example, by responding with a ECPDU 800 of the general form depicted in FIG. 8 containing an ECP acknowledgment. In response to a determination at block 722 that the proposed virtual link parameters were not acknowledged by access switch 404, meaning that the configuration of the virtual link 500 was unsuccessful, the process proceeds to block 724, which depicts VLM 510 terminating the virtual link 500 for which configuration was attempted and freeing any resources associated with the terminated virtual link 500. Thereafter, the process returns to block 702, which has been described. If, however, VLM 510 determines at block 722 that the proposed virtual link parameters were acknowledged by access switch 404, meaning that the configuration of the virtual link 500 was successful, the process proceeds to block 724, which depicts VLM 510 implementing the proposed virtual link configuration for the relevant virtual link 500 and recording the virtual link parameters in the relevant entry 600 of VL CP 502. Thereafter, the process shown in FIG. 7 returns to block 702, which has been described.

Returning now to block 704, in response to a determination at that the event type of the detected event is VL enforce, meaning that VLM 510 has detected a deviation of the monitored statistics of a virtual link 500 from VL CP 502, the process proceeds from block 704 to block 730. Block 730 depicts VLM 510 enforcing VL CP 502 for the relevant virtual link 500. For example, if the detected deviation resulted from a virtual link 500 utilizing a greater bandwidth share than allocated to the virtual link 500, then VLM 510 may, for example, impose a queuing delay on one or more VMs 450 associated with the virtual link 500, either internally to VMM 430 or through messaging with one or more VMs 450. If, on the other hand, the detected deviation from VL CP 502 was a lower QoS than specified by VL CP 502, then VLM 510 may enforce the QoS specified for the virtual link 500 by VL CP 502, for example, by increasing the QoS priority of frames of the relevant virtual link 500. Following block 730, the process of FIG. 7 returns to block 702, which has been described.

Figure 9:
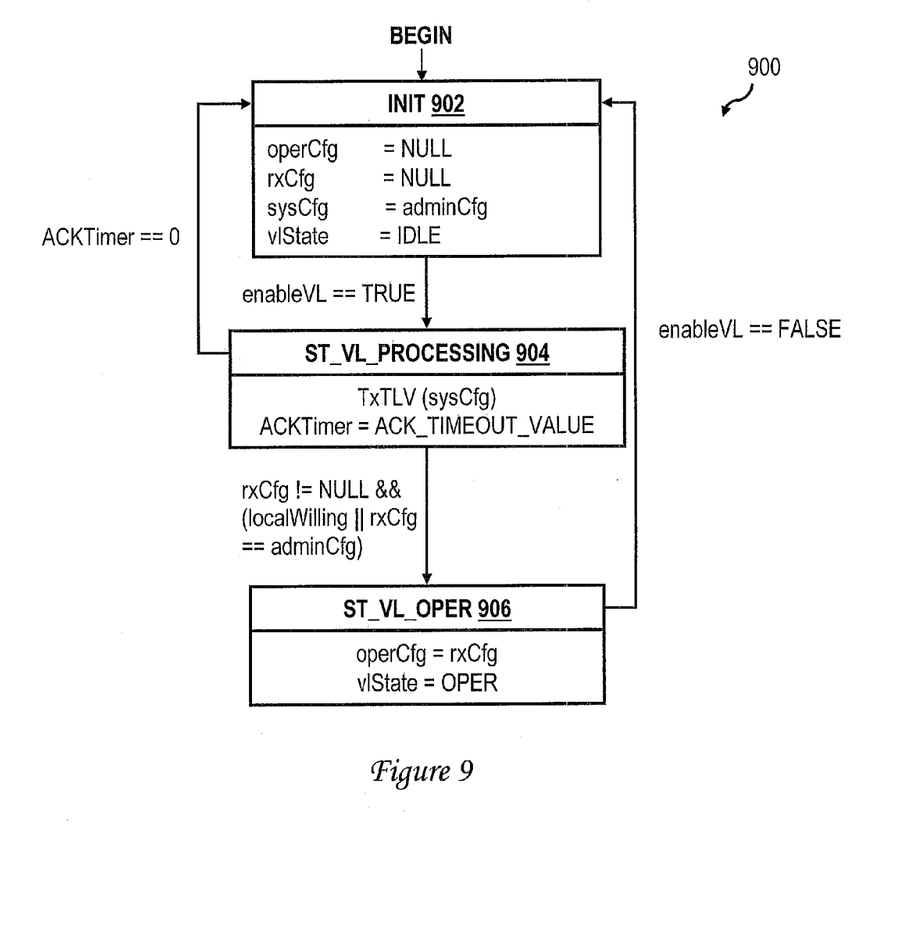
FIG. 9 illustrates an exemplary state machine that may be implemented per virtual link by a VLM to implement the process of FIG. 7 in accordance with one embodiment.

With reference now to FIG. 9, there is illustrated an exemplary state machine 900 that may be implemented per virtual link 500 by VLM 510 to implement the process of FIG. 7 in accordance with one embodiment. In the depicted embodiment, state machine 900 begins in INIT (initialization) state 902 in which the associated virtual link 500 is idle and no associated configuration has been established.

State machine 900 then proceeds from INIT state 902 to ST_VL_PROCESSING (Station Virtual Link Processing) state 904 in response to an input enabling the associated virtual link 500. In ST_VL_PROCESSING state 904, VLM 510 transmits proposed virtual link parameters (TxTLV(sysCfg)) to access switch 404, as discussed above with reference to block 720 of FIG. 7 and FIG. 8, and then initializes and invokes an acknowledgement timer (ACKTimer). If the acknowledgment timer times out prior to receipt by VLM 510 of an acknowledgement of the proposed virtual link parameters, then the virtual link 500 is idled, and state machine 900 returns to INIT state 902. If, however, access switch 404 confirms by an acknowledgment message the proposed virtual link parameters prior to expiration of the acknowledgment timer, state machine 900 proceeds to ST_VL_OPER (Station Virtual Link Operating) state 906.

While state machine 900 is in ST_VL_OPER state 906, the associated virtual link 500 is in the operating (OPER) state and employs a configuration (operCfg) mutually agreed upon by VLM 510 and access switch 404. In response to receipt of an input disabling the virtual link 500, state machine 900 returns from ST_VL_OPER state 906 to INIT state 902, which is described above.

Figure 10:
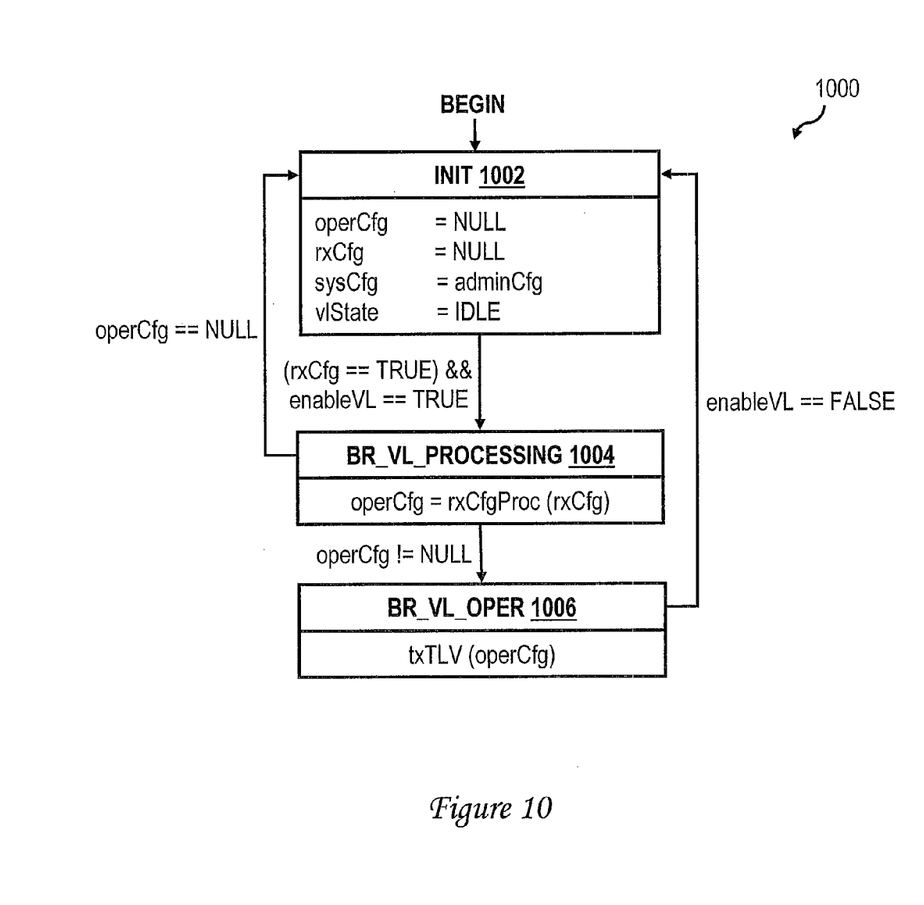
FIG. 10 depicts an exemplary state machine that may be implemented per virtual link by an access switch to support the process of FIG. 7 in accordance with one embodiment.

Referring now to FIG. 10, there is depicted an exemplary state machine 1000 that may be implemented per virtual link 500 by access switch 404 to support the process of FIG. 7 in accordance with one embodiment. In the depicted embodiment, state machine 1000 begins in INIT (initialization) state 1002 in which the associated virtual link 500 is idle and no associated configuration has been established.

State machine 1000 then proceeds from INIT state 1002 to BR_VL_PROCESSING (Bridge Virtual Link Processing) state 1004 in response to an input enabling the associated virtual link 500 and proposed virtual link parameters, as discussed above with reference to block 720 of FIG. 7 and FIG. 8. In response to a determination by access switch 404 not to implement the proposed virtual link parameters, access switch 404 does not send an acknowledgment of the proposed virtual link parameters, and state machine 1000 returns to INIT state 1002. If, however, access switch 404 makes a determination to implement the proposed virtual link parameters, state machine 1000 proceeds to BR_VL_OPER (Bridge Virtual Link Operating) state 1006.

When state machine 1000 transitions to BR_VL_OPER state 1006, access switch 404 confirms its implementation of the proposed virtual link parameters by transmitting an acknowledgment message (txTLV). The associated virtual link 500 thereafter remains in the operating (OPER) state and employs a configuration (operCfg) mutually agreed upon by VLM 510 and access switch 404 until an input is received disabling the virtual link 500. When such an input is received, state machine 1000 returns from BR_VL_OPER state 1006 to INIT state 1002.

As has been described, in some embodiments a physical host executes a virtual machine monitor (VMM) that instantiates a plurality of virtual machines (VMs). The VMM supports processing of a virtual link manager (VLM) that deploys and configures a plurality of Layer 2 virtual links sharing bandwidth of a Layer 2 physical link between the physical host and an access switch. The VMM communicates parameters of the plurality of virtual links with the access switch, for example, by utilizing ECP to transport a VLCP TLV.

While the present invention has been particularly shown as described with reference to one or more preferred embodiments, it will be understood by those skilled in the art that various changes in form and detail may be made therein without departing from the spirit and scope of the invention. For example, it should be understood that although the detailed description provided herein provides multiple embodiments of cloud computing environments, the teachings disclosed herein are not limited to cloud computing environments. Rather, embodiments can be implemented in any other type of computing environment now known or later developed, including client-server and peer-to-peer computing environments.

Further, although aspects have been described with respect to computer systems executing program code that direct the functions described herein, it should be understood that embodiments may alternatively be implemented as a program product including a storage medium (e.g., data storage 310) storing program code that can be processed by a data processing system to cause the data processing system to perform one or more of the described functions.

What is claimed is:
1. A program product, comprising:
a computer-readable storage device; and
program code stored within the computer-readable storage device that, when executed by a computer having a physical network interface, causes the computer to perform:

a virtual machine monitor (VMM) that executes within the computer instantiating a plurality of virtual machines (VMs) in the computer;

a virtual link manager (VLM) that executes within or on the VMM deploying and configuring a plurality of Layer 2 virtual links sharing bandwidth of a Layer 2 physical link between the physical network interface and an access switch;

the VMM uniquely defining each of the plurality of virtual links by applying a respective one of a plurality of different service tags to frames of the plurality of virtual links, wherein the plurality of Layer 2 virtual links span at least from the VMM to the access switch such that the physical network interface need not provide explicit tagging support for the plurality of Layer 2 virtual links; and the VMM communicating parameters of the plurality of virtual links with the access switch.

2. The program product of claim 1, wherein the program code further causes the computer to perform:

the VMM instantiating a virtual network having an associated Layer 2 forwarding table;

the VMM applying at least some of the plurality of different service tags to frames by reference to the Layer 2 forwarding table.

3. The program product of claim 1, wherein the program code further causes the computer to perform:

the VLM recording the parameters of the plurality of virtual links in a data structure.

4. The program product of claim 1, wherein the parameters include a bandwidth share of the Layer 2 physical link available to each of the plurality of virtual links.

5. The program product of claim 1, wherein the parameters include a quality of service (QoS) to be accorded to at least one of the plurality of virtual links.

6. The program product of claim 1, wherein the communicating includes communicating utilizing the Edge Control Protocol (ECP).

7. The program product of claim 1, wherein the program code further causes the computer to perform:

the VLM monitoring and enforcing the parameters of the plurality of virtual links.

8. A data processing system, comprising:

a processor;

data storage coupled to the processor;

a physical network interface coupled by a physical link to an access switch; and program code stored within the data storage that, when executed by a processor, causes the data processing system to perform:

a virtual machine monitor (VMM) instantiating a plurality of virtual machines (VMs) in the data processing system;

a virtual link manager (VLM) that executes within or on the VMM deploying and configuring a plurality of Layer 2 virtual links sharing bandwidth of the physical link between the physical network interface and the access switch;

the VMM uniquely defining each of the plurality of virtual links by applying a respective one of a plurality of different service tags to frames of the plurality of virtual links, wherein the plurality of Layer 2 virtual links span at least from the VMM to the access switch such that the physical network interface need not provide explicit tagging support for the plurality of Layer 2 virtual links; and the VMM communicating parameters of the plurality of virtual links with the access switch.

9. The data processing system of claim 8, wherein the program code further causes the data processing system to perform:

the VMM instantiating a virtual network having an associated Layer 2 forwarding table;

the VMM applying at least some of the plurality of different service tags to frames by reference to the Layer 2 forwarding table.

10. The data processing system of claim 8, wherein the program code further causes the data processing system to perform:

the VLM recording the parameters of the plurality of virtual links in a data structure.

11. The data processing system of claim 8, wherein the parameters include a bandwidth share of the Layer 2 physical link available to each of the plurality of virtual links.

12. The data processing system of claim 8, wherein the parameters include a quality of service (QoS) to be accorded to at least one of the plurality of virtual links.

13. The data processing system of claim 8, wherein the communicating includes communicating utilizing the Edge Control Protocol (ECP).

14. The data processing system of claim 8, wherein the program code further causes the data processing system to perform:

the VLM monitoring and enforcing the parameters of the plurality of virtual links.

\* \* \* \* \*